United States Patent
Griffin

(10) Patent No.: US 10,931,918 B1
(45) Date of Patent: Feb. 23, 2021

(54) PROVIDING FOR COGNITIVE RECOGNITION IN A COLLABORATION ENVIRONMENT

(71) Applicant: Cisco Technology, Inc., San Jose, CA (US)

(72) Inventor: Keith Griffin, Oranmore (IE)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/814,790

(22) Filed: Mar. 10, 2020

(51) Int. Cl.
*H04N 7/15* (2006.01)
*G06Q 10/10* (2012.01)
*H04N 5/232* (2006.01)
*G06K 9/00* (2006.01)
*G10L 17/00* (2013.01)

(52) U.S. Cl.
CPC ........... *H04N 7/15* (2013.01); *G06K 9/00288* (2013.01); *G06Q 10/1095* (2013.01); *G10L 17/00* (2013.01); *H04N 5/23245* (2013.01)

(58) Field of Classification Search
CPC ............ H04N 7/15; H04N 7/14; H04N 5/232; G06Q 10/10; G06K 9/00; G10L 17/00
USPC .............................. 348/14.01–14.16; 715/753
See application file for complete search history.

(56) References Cited

U.S. PATENT DOCUMENTS

| 9,516,022 | B2 | 12/2016 | Borzycki et al. | |
| 9,721,233 | B2 | 8/2017 | Norton et al. | |
| 2009/0079812 | A1* | 3/2009 | Crenshaw | H04N 7/142 348/14.01 |
| 2010/0318399 | A1* | 12/2010 | Li | G06Q 10/1093 705/7.18 |
| 2012/0185291 | A1* | 7/2012 | Ramaswamy | G06Q 10/1095 705/7.19 |
| 2013/0124207 | A1* | 5/2013 | Sarin | H04N 5/232 704/275 |
| 2014/0283013 | A1* | 9/2014 | Marco | H04W 12/08 726/19 |
| 2015/0109399 | A1* | 4/2015 | Kuscher | H04N 7/147 348/14.02 |
| 2016/0286166 | A1* | 9/2016 | Sandvik | G06K 9/00228 |
| 2017/0339216 | A1* | 11/2017 | Carlos | H04L 67/06 |
| 2017/0357917 | A1* | 12/2017 | Holmes | G06Q 10/06314 |
| 2019/0019162 | A1 | 1/2019 | Yang et al. | |

FOREIGN PATENT DOCUMENTS

| CN | 106934471 A | 7/2017 |
| CN | 107909174 A | 4/2018 |

* cited by examiner

*Primary Examiner* — Melur Ramakrishnaiah
(74) *Attorney, Agent, or Firm* — Polsinelli PC

(57) ABSTRACT

The present technology pertains to a non-transitory computer readable medium comprising instructions stored thereon, the instructions effective to cause at least one processor to detect a facial recognition trigger by a device in a meeting room and present a notification in a meeting room that a camera is be to activated in order to recognize a user, wherein the meeting room is a multi-user meeting room.

20 Claims, 8 Drawing Sheets

PROVIDING FOR COGNITIVE RECOGNITION IN A COLLABORATION ENVIRONMENT

TECHNICAL FIELD

The present technology pertains to camera activation in a collaboration environment, and more specifically pertains to activating a camera for use in identifying a user in a manner that makes meeting participants in a collaboration environment aware of the camera activation.

BACKGROUND

Enterprise operations regularly have the need to use conferencing technologies to conduct intra- and inter-enterprise meetings with colleagues, suppliers, and clients in remote locations. As such, many conference spaces include video conferencing equipment such as cameras and microphones. Meeting participants in these rooms expect that such equipment is not recording their conversations or video when the room is not actively engaged in a video conference.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
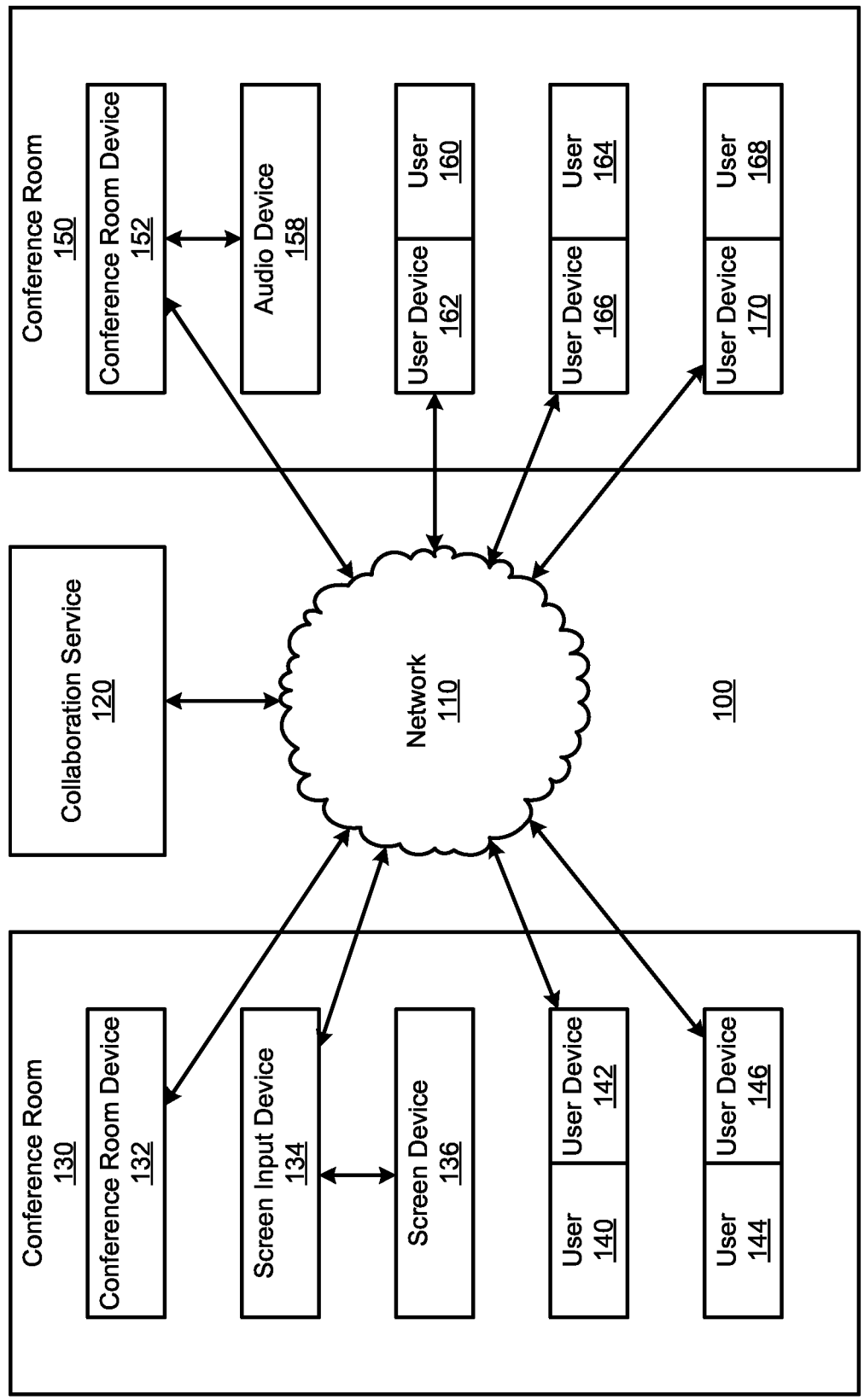
FIG. 1 illustrates an example configuration of devices and a network in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

OVERVIEW

The present technology includes instructions stored on a non-transitory computer-readable medium. When executed by a processor, these instructions cause the processor to detect a facial recognition trigger by a device in a meeting room capable of hosting multiple users. Further, the instructions cause the processor to present a notification in the meeting room that a camera is to be activated in order to recognize a user.

The present technology includes a system including at least one processor and at least one computer-readable medium. The computer-readable medium contains instructions which can be executed by the processor. These instructions cause the processor to detect a facial recognition trigger by a device in a meeting room capable of hosting multiple users. Further, the instructions cause the processor to present a notification in the meeting room that a camera is to be activated in order to recognize a user.

EXAMPLE EMBODIMENTS

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for a system that makes people in a collaboration environment aware of an activation of a camera and the context for why the camera has been activated. Many collaboration environments, such as conference rooms, include video conferencing equipment such as cameras and microphones. People meeting in these rooms expect that such equipment is not recording their conversations or video when the room is not actively engaged in a video conference.

While people don't want a camera or microphone to be recording conversations in meeting rooms where microphones or cameras are not required to conduct the meeting, people have become accustomed to using voice assistants that, in some cases, monitor audio to identify a wake word to determine when they are being invoked to assist a user. In some cases, these voice assistants need to determine a particular user account for which to perform an action.

Another trend that influences user experience expectations involves authentication, security, and privacy. Proliferation of biometric authentication, two-factor authentication, and other authentication means, coupled with users' increasing awareness of privacy concerns online, reflect and drive user expectations for privacy and security. In their everyday lives, users expect to authenticate themselves to devices (such as smartphones) and services (such as secure online banking) with increasing regularity. However, meeting participants may be unaccustomed to authenticating themselves to a meeting area, as contrasted to logging into a meeting service and using equipment in a meeting area to access the meeting service.

The above factors regarding most persons' expectations for a behavior of meeting environment equipment, and the desire for privacy and confidentiality in a meeting environment create challenges when attempting to provide a meeting environment that has modern artificial intelligence assistants.

The present technology solves these problems by providing people in a meeting room with cues that makes people in a collaboration environment aware of an activation of a camera and the context for why the camera has been activated. The present technology preserves people's trust in the electronic privacy of a meeting environment, while making artificial intelligence assistants available to meeting participants.

The disclosed technology involves systems and methods to allow for an intuitive, easy user experience that respects privacy and authentication concerns. The user, upon entering a collaborative environment, such as a conference room, will emit a trigger for the user interface. This trigger can be proximity (for example, a personal device using an ultrasonic sensor, a time-of-flight sensor, a microphone, a Bluetooth sensor, or a near-field communication (NFC) sensor), the user speaking to note their presence, a motion sensor, a physical-interface input, etc.

Once triggered, the user will be notified that a recognition device will be turned on to recognize the user and an associated user account. The recognition device will activate in the collaboration environment and can use facial recognition technology, voice printing, or other means to confirm the identity of the user. The identity of the user can be determined based on biometric data such as facial recognition data or voice fingerprint data stored in association with a user account or an index that associates user accounts with biometric data. Pending authentication, the system will allow the user to access the collaboration environment service. Outside of this window of authentication, the camera will remain in a standby state in order to respect user privacy and meet user expectations regarding the privacy of the collaboration environment.

FIG. 1 is a conceptual block diagram illustrating an example network environment 100 for providing conferencing capabilities, in accordance with some aspects of the present technology. Although FIG. 1 illustrates a client server network environment 100, other embodiments of the subject technology may include other configurations.

The network environment 100 includes at least one collaboration service 120 that is in communication with devices from one or more geographic locations. In FIG. 1, the geographic locations include conference room 130 and conference room 150.

The various devices within conference rooms 130 and 150 and the collaboration service 120 communicate via a network 110 (e.g., the Internet). The network 110 can be any type of network and may include, for example, any one or more of a cellular network, a satellite network, a personal area network (PAN), a local area network (LAN), a wide area network (WAN), a broad band network (BBN), the Internet, and the like. Further, the network 110 can include, but is not limited to, any one or more of the following network topologies, including a bus network, a star network, a ring network, a mesh network, a star-bus network, tree or hierarchical network, and the like. Network 110 can be a public network, a private network, or a combination thereof. Communication network 110 may be implemented using any number of communications links associated with one or more service providers, including one or more wired communication links, one or more wireless communication links, or any combination thereof. Additionally, network 110 can be configured to support the transmission of data formatted using any number of protocols.

Conference room 130 includes a conference room device 132, a screen input device 134 (or a screen assistive device), and a screen device 136. The screen device 136 may be a monitor, a television, a projector, a tablet screen, or other visual device that may be used during a conferencing session or local meeting. The screen input device 134 is configured to interface with the screen device 136 and provide the conferencing session input for the screen device 136. The screen input device 134 may be integrated into the screen device or separate from the screen input device 134 and communicate with the screen input device via a Universal Serial Bus (USB) interface, a High-Definition Multimedia Interface (HDMI) interface, a computer display standard interface (e.g., Video Graphics Array (VGA), Extended Graphics Array (XGA), etc.), a wireless interface (e.g., Wi-Fi, infrared, Bluetooth, etc.), or other input or communication medium. In some embodiments, screen input device 134 may be integrated into conference room device 132.

The conference room device 132 is configured to detect when a user comes within range of the conference room 130, the conference room device 132, or some other geographic location marker. The conference room device 132 is further configured to coordinate with the other devices in the conference room 130 and the collaboration service 120 to start and maintain a conferencing session. For example, the conference room device 132 may interact with a user device associated with one or more users to facilitate a conferencing session. The user device may be, for example, a user's smart phone, tablet, laptop, or other computing device. In some embodiments, the user device can also be associated with a user account, e.g., a user is logged into a user account on the user device.

The user account can be a user account to access computing resources of an enterprise (e.g., an employee user account with an employer), or can be a user account with a conferencing service that permits the user and user device to access and utilize the conferencing service.

As shown in FIG. 1, conference room 130 further includes one or more users 140 and 144. Each user may be associated with one or more user devices 142 and 146. The user devices 142 and 146 may include smart phones, tablets, laptop computers, conferencing devices, or other computing devices. The user devices 142 and 146 may have an operating system and run one or more collaboration applications that facilitate conferencing or collaboration. For example, a collaboration application running on a user device 142 may be configured to interface with the collaboration service 120 or the conference room device 132 in facilitating a conferencing session for a user.

Conference room 150 includes a conference room device 152, an audio device 158, one or more users (users 160, 164 and 168), and one or more user devices 162, 166, and 170. Conference room 150 is not shown with a screen device or a screen input device because some geographic locations may not have access to these devices.

The audio device 158 may include one or more speakers, microphones, or other audio equipment that may be used during the conferencing session. The conference room device 152 is configured to interface with the audio device 158 and provide the conferencing session input for the audio device 158. The audio device 158 may be integrated into the conference room device 152 or separate from the conference room device 152 and communicate with the conference room device 152 via an audio cable interface, a Universal Serial Bus (USB) interface, a High-Definition Multimedia Interface (HDMI) interface, a wireless interface (e.g., Wi-Fi, infrared, Bluetooth, etc.), or other input or communication medium.

Figure 2:
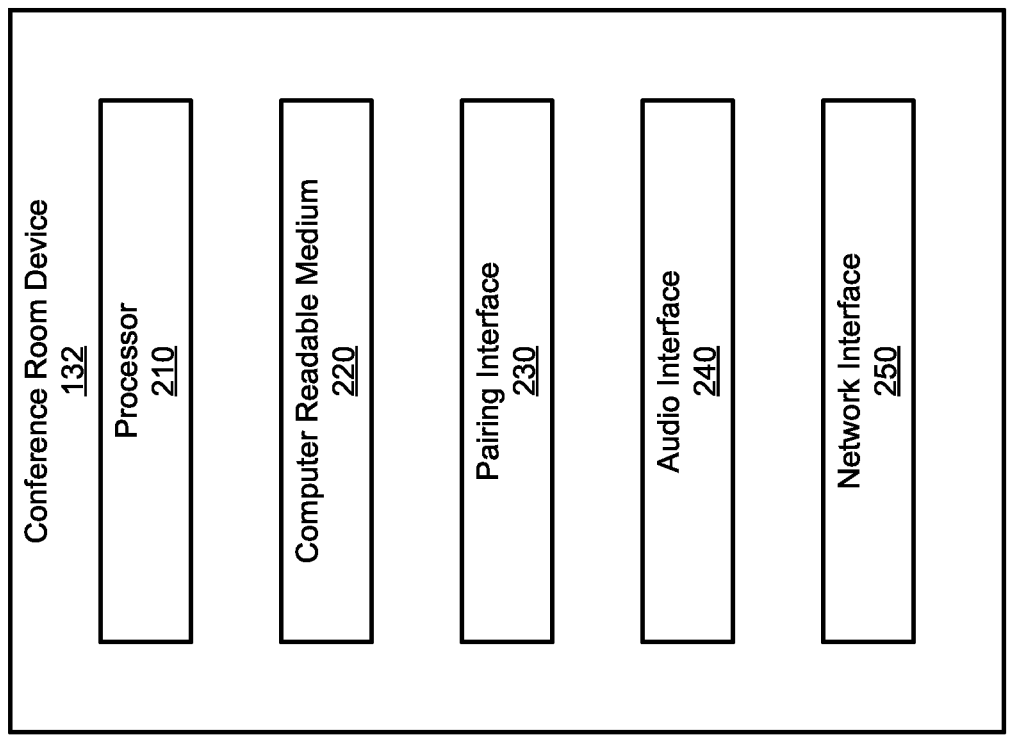
FIG. 2 illustrates an example configuration of devices in accordance with some aspects of the present technology.

FIG. 2 is an illustration of a conference room device 132, in accordance with some aspects of the present technology. The conference room device 132 may include a processor 210 and a computer-readable medium 220 storing instructions that, when executed by the conference room device 132, cause the conference room device 132 to perform various operations for facilitating a conferencing session. The conference room device 132 may further include a pairing interface 230, an audio interface 240, and a network interface 250. The network interface 250 may be configured to facilitate conferencing sessions by communicating with a collaboration service, screen input device, or user device.

The pairing interface 230 may be configured to detect when a user is within range of the conference room, the conference room device 132, or some other geographic location marker. For example, the pairing interface 230 may determine when the user is within a threshold distance of the conference room device 132 or when the user is within range of a sensor of the conference room device 132. The pairing interface may include one or more sensors including, an ultrasonic sensor, a time-of-flight sensor, a microphone, a Bluetooth sensor, a near-field communication (NFC) sensor, or other range determining sensors.

An ultrasonic sensor may be configured to generate sound waves. The sound waves may be high frequency (e.g., frequencies in the ultrasonic range that are beyond the range of human hearing). However, in other embodiments, other frequency ranges may be used. In some embodiments, the sound waves may be encoded with information such as a current time and a location identifier. The location identifier may be, for example, a conference room device 132 identifier, a geographic location name, coordinates, etc. The ultrasonic sound waves encoded with information may be considered an ultrasonic token.

A user device may detect the ultrasonic token and inform a collaboration service that the user device detected the ultrasonic token from the conference room device 132. The collaboration service may check the ultrasonic token to make sure the sound waves were received at the appropriate time and location. If the user device received the ultrasonic token at the appropriate time and location, the collaboration service may inform the conference room device 132 that the user device is within range and pair the conference room device 132 with the user device.

In other embodiments, the conference room device 132 and the user device may pair together directly, without the assistance of a collaboration service. Furthermore, in some embodiments, the roles are reversed where the user device emits high frequency sound waves and the ultrasonic sensor of the conference room device detects the high frequency sound waves from the user device. In still other embodiments, an ultrasonic sensor may be configured to generate high frequency sound waves, detect an echo which is received back after reflecting off a target, and calculate the time interval between sending the signal and receiving the echo to determine the distance to the target. A time-of-flight sensor may be configured to illuminate a scene (e.g., a conference room or other geographic location) with a modulated light source and observe the reflected light. The phase shift between the illumination and the reflection is measured and translated to distance.

The audio interface 240 may be configured to provide the audio component to the conferencing session. For example, the audio interface 240 may receive audio from participants in one geographic location of the conferencing session and play the audio from participants in another geographic location. The audio interface 240 may also be configured to facilitate the conferencing session by providing and receiving audio from meeting participants, user devices, or the collaboration service. In some embodiments, the audio interface 240 may prompt the user to start a meeting, prompt the user to end a meeting, prompt the user for instructions, or receive instructions from meeting participants. The audio interface 240 may include one or more speakers, microphones, or other audio equipment. In other embodiments, the audio interface 240 may interface with one or more speakers, microphones, or other audio equipment. In other embodiments, the audio interface 240 may interface with one or more speakers, microphones, or other audio devices external to the conference room device 132.

Figure 3A:
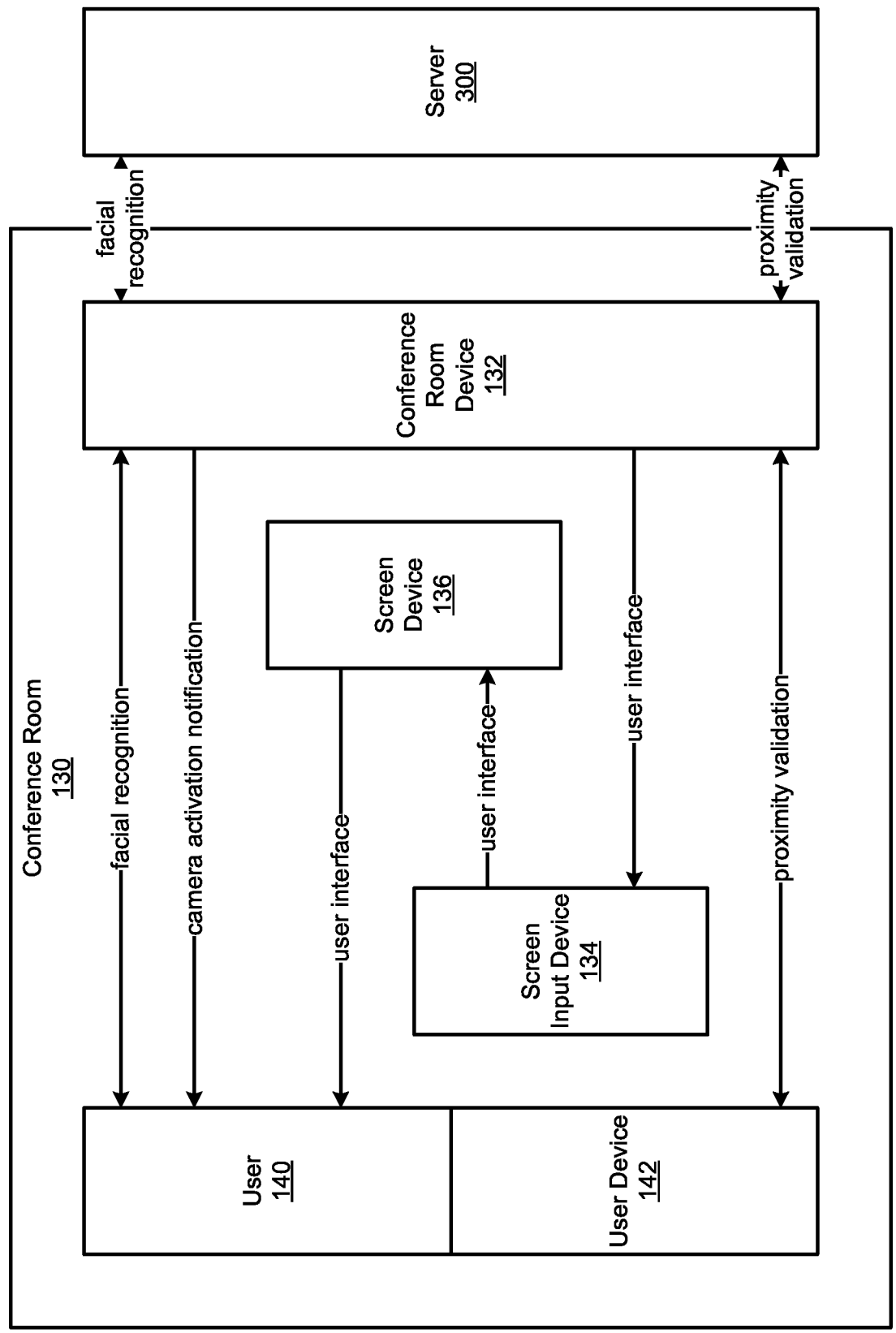
FIGS. 3A, 3B, and 3C illustrate example configurations of devices and a network in accordance with some aspects of the present technology.
Figure 3B:
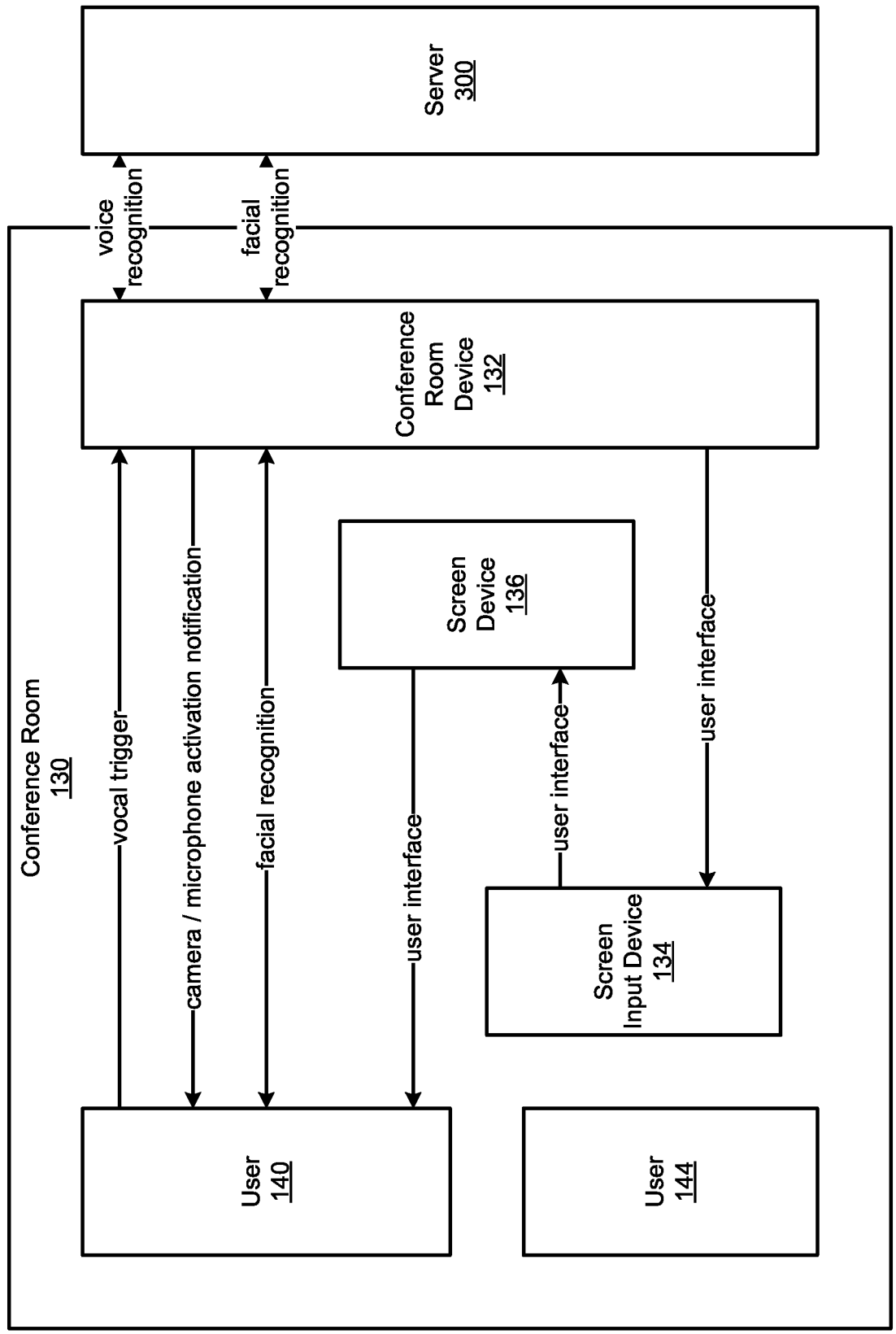
Figure 3C:
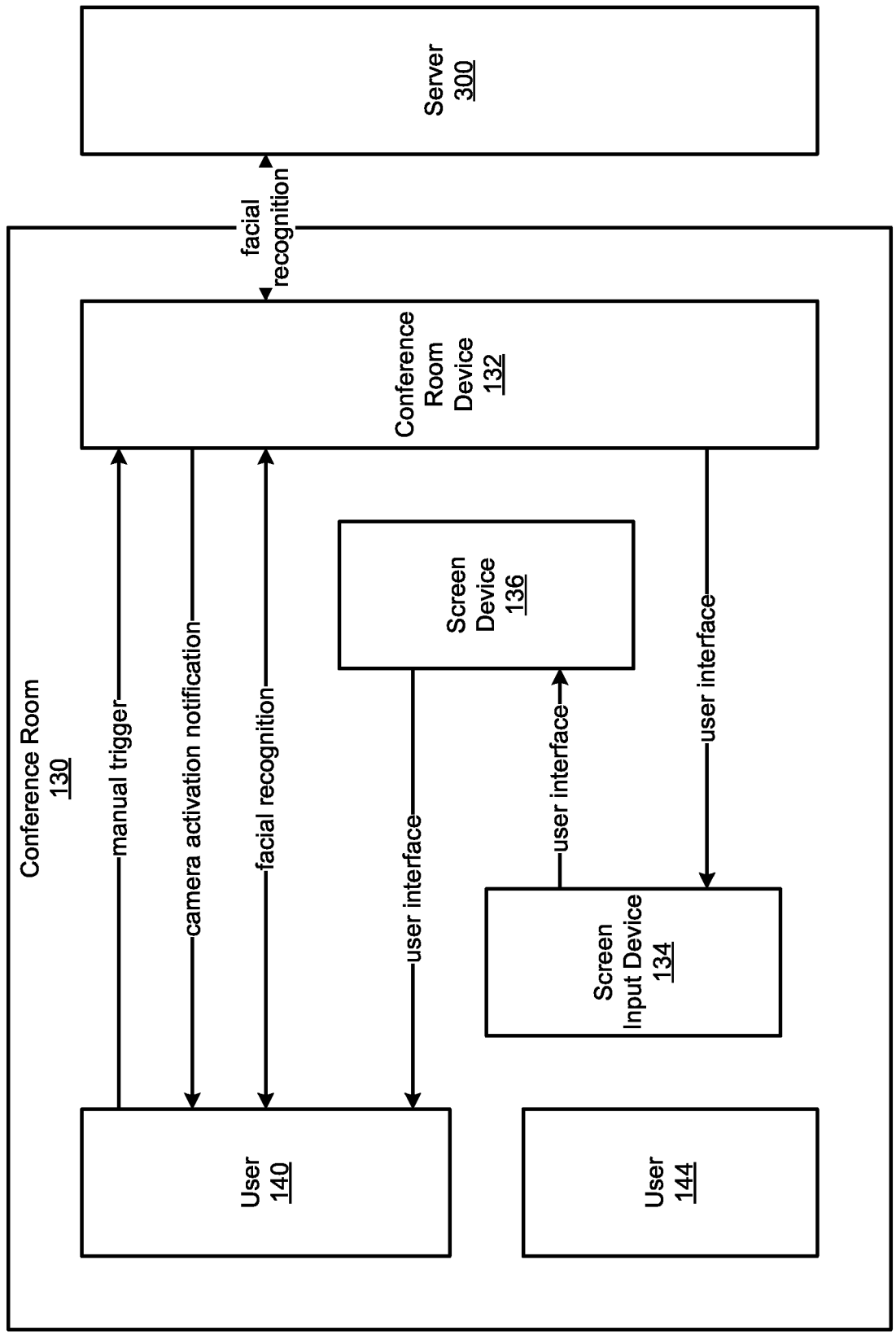

FIGS. 3A, 3B, and 3C are example configuration of devices and a network in accordance with some aspects of the present technology. A user triggers the conference room device, which prompts the conference room to device to notify the user that a camera will activate for authentication. After or during authentication, the user interface appears to the user.

In FIG. 3A, the trigger can occur when user 140 with user device 142 comes within a certain proximity of conference room device 132. The proximity validation may occur due to an ultrasonic sensor, a time-of-flight sensor, a Bluetooth sensor, a near-field communication (NFC) sensor, or other range determining sensors on conference room device 132. Proximity can also occur by methods other than peer-to-peer, in which a server 300 is used to update locations and validate when conference room device 132 and user device 142 are in sufficient proximity. The proximity validation can also include determining the identity of user 140 from user device 142 if the identity of user 140 is paired with user device 142. In some embodiments, identity of user 140 can be paired with user device 142 when user 140 is logged into an application running on user device 142, where the application is effective to communicate with server 300 or conference room device 132. In some embodiments, identity of user 140 can be paired with user device 142 when user 140 enters network credentials, or credentials for use with a conferencing service through a web browser interface on user device 142. In some embodiments, identity or user 140 can be paired with user device 142 when user device 142 provides a token or other data object identifying user 140 to conference room device 132 or server 300.

In response to the trigger, conference room device 132 can notify user 140 that a camera will turn on for facial recognition. This notification can be a voice recording, a screen notification presented through screen input device 134 and screen device 136, an aural cue, or presented by some other means. After the camera activation notification, the camera turns on and conference room device 132 can engage in facial recognition, interacting with a server 300 to confirm the identity of user 140. The camera can be a part of conference room device 132, screen input device 134, screen device 136, or an independent device in conference room 130. In some embodiments, the camera can be used at other times for video-conferencing capabilities.

In some embodiments a user can temporarily disable activation of a recognition device, such as a camera due to a trigger until certain conditions are met. For example, the camera the user 140 can configure the camera to remain disabled as long as User 140 remains in the room, or for a set amount of time. In some embodiments, when a user configures a camera activation to be temporarily disabled, the configuration will only remain in effect for as long as the user is in the room. For instance, if user 140 sets the camera deactivation period for one hour but leaves the room after half an hour, the camera may reset so that when a new user walks into the room, it can appropriately recognize that user.

After or during the facial recognition, screen device 136 can present a user interface by way of conference room device 132 and screen input device 134 to user 140. The user interface can display facial recognition visuals, retrieve meeting schedules taken from an internal calendar associated with user 140, or other information. The user interface can suggest specific actions to user 140.

In FIG. 3B, the trigger can occur when user 140 speaks. User 140 can speak a specific wakeword to activate the camera, or the trigger can be clearing a set volume threshold. The wakeword can, in some embodiments, cause conference room device 132 to fulfill a command after completing authentication of user 140. When multiple users 140 and 144 are in the room, conference room device 132 can use voice recognition and data on server 300 to help determine the identity of the speaker in order to display the appropriate user interface for that user. The system in FIG. 3B can engage in voice recognition, facial recognition, or both to validate user identity, and can be configured in any of these ways.

In FIG. 3C, the trigger can occur when user 140 manually interacts with an interface. User 140 can press a button on a touch interface, enter a keyboard command, or otherwise manually trigger conference room device 132 to present a conferencing interface.

The configurations of the systems shown in FIGS. 3A and 3B accomplish user validation while presenting an easy-to-use interface while respecting user privacy. Multiple embodiments allow for different triggers to be used to activate the system, from proximity pairing to vocal triggers to keyboard inputs, among others. The user is then notified that a camera will turn on for facial recognition, which mitigates surprise at the camera activation while putting low demands on the user for authentication. Finally, the user interface presented can show facial recognition images coupled with information relevant to conference room 130, allowing for an easy experience on the user.

When multiple users 140 and 144 are present, meeting user expectations for privacy and authentication can present additional challenges. When multiple users are present when a trigger is emitted, conference room device 132 can recognize one, some, or all of the users present. It can require that multiple types of identification, such as facial recognition and voice printing, take place to authenticate the appropriate user.

Sometimes, a user 140 will want to enter a collaboration environment but not use any available services for a while. For example, suppose an employee gets to a conference room ten minutes before a conference call is scheduled to begin. In some cases, user 140 can be authenticated upon entering conference room 130, such as when user proximity is a trigger, and in others can be authenticated when user 140 chooses, such as when a wakeword is a trigger. To account for these situations, the camera can have a set time period during which, in absence of a new trigger, it assumes that the last-validated user remains in the room, and a user interface 400 presents information accordingly.

User 140 may not want to utilize the services available in conference room 130. In these cases, user 140 can return the camera to standby mode by using a specified input or command. The camera can go back to standby mode at the behest of user 140, when user 140 leaves the room, or after a set period of time.

In some instances, it will be desirable for the camera to disregard the wishes of user 140. For instance, if the camera has been disabled for 30 minutes but user 140 left conference room 130 after 10 minutes and another user 144 entered, it would be desirable for the system to accept new triggers.

Figure 4:
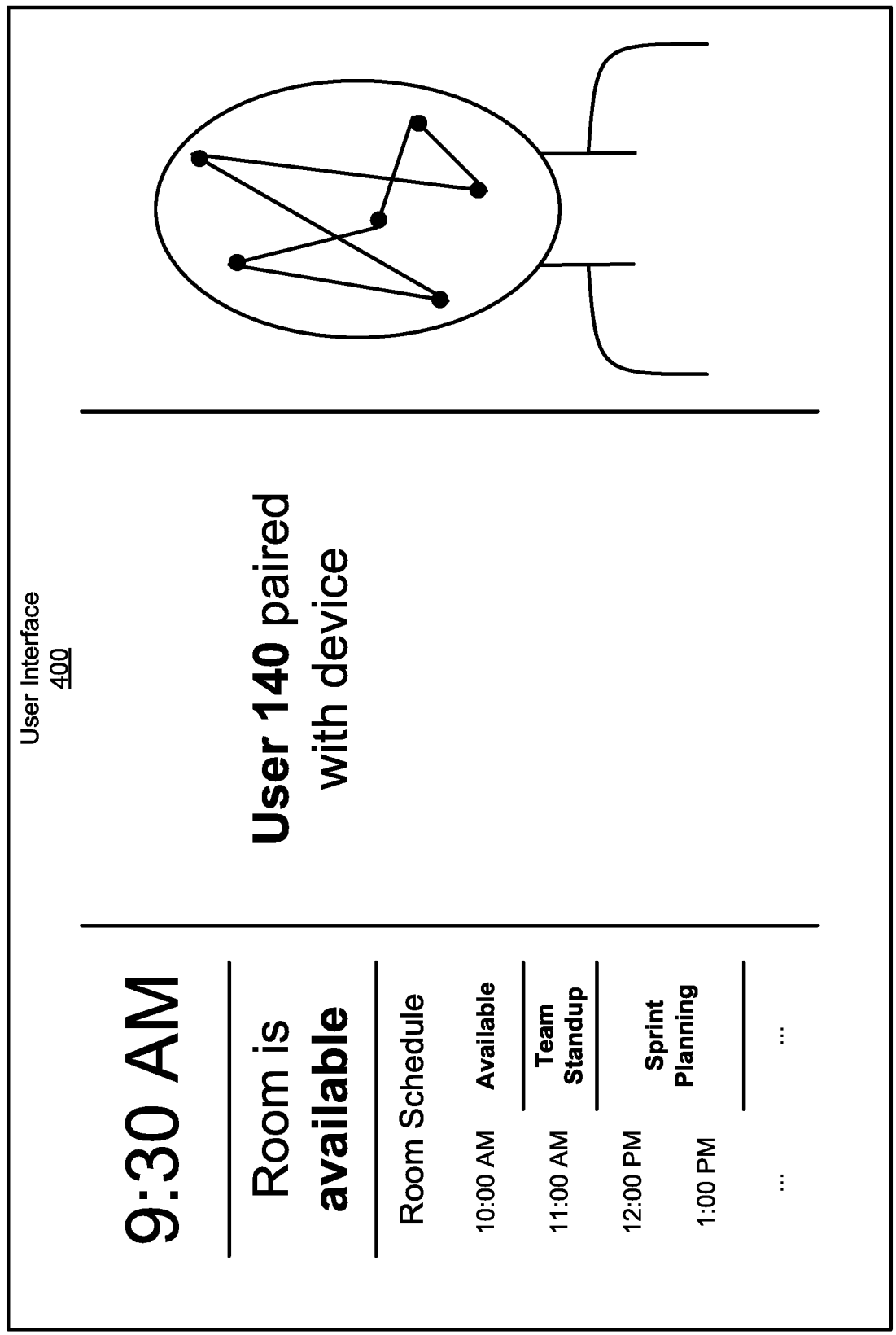
FIG. 4 illustrates an example user interface in accordance with some aspects of the present technology.

FIG. 4 illustrates an example configuration of a user interface in accordance with some aspects of the present technology. The user interface can display facial recognition images, information about the conference room, or suggest actions to take for a specific user.

User interface 400 is divided into three columns. The left column shows the time, room status, as well as the room schedule for the day. This orients user 140 to the conference room and provides information to user 140. In some embodiments, user interface 400 can suggest specific actions for user 140 to take, such as scheduling a meeting or joining a conference call.

The center and right columns show that user 140 has been identified and paired with conference room device 132. The center column acknowledges the identity of user 140. The right column shows facial recognition images which allowed conference room device 132 to identify user 140. In some embodiments, these images can be shown while user 140 is in the process of being identified.

Figure 5:
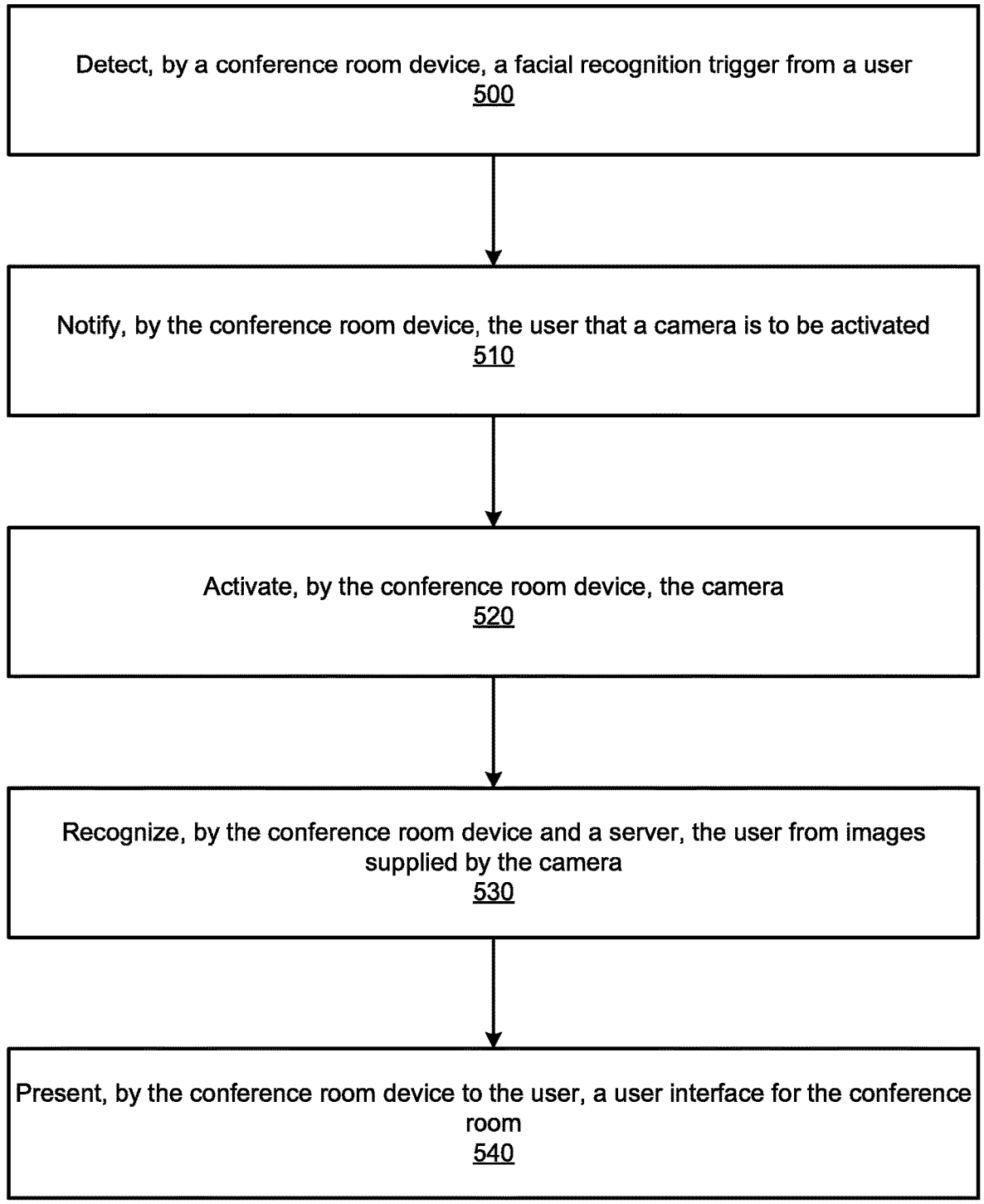
FIG. 5 illustrates an example method embodiment in accordance with some aspects of the present technology.

FIG. 5 illustrates an example method embodiment in accordance with some aspects of the present technology. A user triggers a facial recognition trigger in a collaboration environment and is notified that a camera will be turned on for facial recognition purposes.

The method begins when conference room device 132 detects (500) a facial recognition trigger from user 140. The facial recognition trigger can be a vocal cue, the proximity of user device 142, a keyboard input, or another trigger. Conference room device 132 can detect the trigger using an ultrasonic sensor, a time-of-flight sensor, a microphone, a Bluetooth sensor, a near-field communication (NFC) sensor, or other range determining sensors.

Conference room device 132 notifies (510) user 140 that a camera is to be activated for the purposes of facial recognition. The notification can be sonic, visual, semantic, or some other kind of notification. After or concurrently with notifying user 140, conference room device 132 activates (520) the camera.

Using input from the camera and data from server 300, conference room device 132 recognizes (530) user 140. Recognition of user 140 can come by facial recognition, voice printing, or other means. Recognition by this means can be paired with an identification of user 140 using the proximity validation of user device 142. If there are multiple users 140 and 144 in conference room 130, in some embodiments conference room device 132 can recognize multiple users.

Once user 140 is recognized, conference room device 132 can present (540) user interface 400 to user 140. User interface 400 can include facial recognition images, information on conference room 130, suggestions for actions that user 140 can take, or other data. If there are multiple users 140 and 144 in conference room 130, conference room device 132 can use speaker identification to determine which user the user interface 400 should be presented for.

In some embodiments, user 140 can subsequently disable the camera until some condition is met, such as the presence of a trigger or the passage of a set amount of time. This can be done visually, aurally, or using a physical interface. In some embodiments, the method can begin even before the condition is met, overriding the preferences of user 140.

While the above description focuses on the use of a camera to recognize a user in a collaboration environment, and to provide appropriate conditions and notifications to maintain the user's expectations of privacy in a collaboration environment, the present technology is equally applicable to other technologies that a user would expect should be off or in standby mode until invoked by the user. For example, the present technology could be used to announce when a voice assistant is in standby mode to locally detect a wake word, as opposed to sending voice data to a server in order to perform a service.

Figure 6:
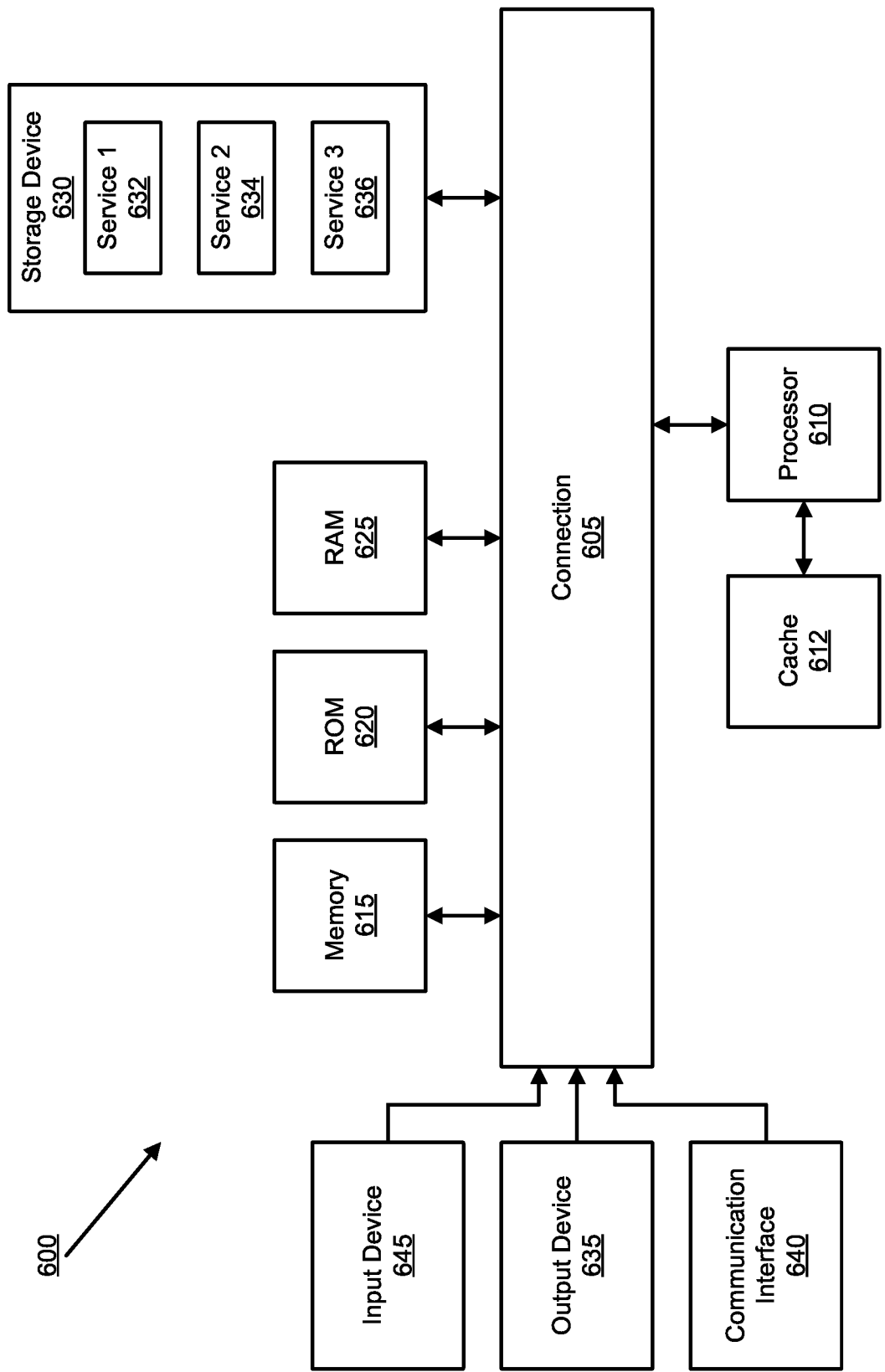
FIG. 6 illustrates an example system embodiment in accordance with some aspects of the present technology.

FIG. 6 shows an example of computing system 600, which can be for example any computing device making up conference room device 132 or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments computing system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example computing system 600 includes at least one processing unit (CPU or processor) 610 and connection 605 that couples various system components including system memory 615, such as read only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a user device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A non-transitory computer readable medium comprising instructions stored thereon, the instructions effective to cause at least one processor to:
   detect, by a device in a meeting room, a triggering event configured to trigger a recognition device and a recognition action to be activated, wherein the triggering event comprises a determination that a user has entered the meeting room, and wherein the recognition action comprises recognizing the user in the meeting room; and
   in response to detecting the triggering event comprising the determination that the user has entered the meeting room, present a notification indicating that the recognition device and the recognition action are being activated in order to recognize the user in the meeting room.

2. The non-transitory computer readable medium of claim 1, wherein the recognition device is a camera or a microphone and the camera or microphone is not engaged in a video conference when the notification is presented.

3. The non-transitory computer readable medium of claim 1, wherein the triggering event comprises determining that the user has entered the meeting room based on at least one of detected speech or a detected a user device proximity.

4. The non-transitory computer readable medium of claim 1, wherein detecting the triggering event comprises detecting a user device proximity, wherein the instructions are effective to cause the at least one processor to determine an identity paired with the user device.

5. The non-transitory computer readable medium of claim 1, the instructions further effective to cause the at least one processor to:
   determine an identity of the user using facial recognition or vocal recognition, and determine a user account associated with the user;
   retrieve meetings from a calendar associated with the user account; and
   suggest an action pertaining to one of the retrieved meetings.

6. The non-transitory computer readable medium of claim 1, wherein the instructions are further effective to cause the at least one processor to:
   identify, using facial recognition, multiple users in the meeting room and associated with user accounts; and
   perform active speaker identification to determine a particular user from the multiple users for which to assist in an action.

7. The non-transitory computer readable medium of claim 1, wherein the instructions are effective to cause the at least one processor:
   detect a wakeword and a command by a voice assistant, wherein the command is specific to a user account action;
   determine an identity of the user using facial recognition or vocal recognition, and determine a user account for the user; and
   perform the command on behalf of the user account.

8. The non-transitory computer readable medium of claim 1, the instructions further effective to cause the at least one processor to:
   receive a command to disable recognition device activation and recognition in the meeting room until a condition is met;
   disable recognition device activation until the condition is met; and re-enable the recognition device based on the condition being met, wherein the condition is that no user is in the meeting room for a period of time.

9. A system comprising:
one or more processors;
at least one non-transitory computer-readable medium comprising computer executable instructions stored thereon, the instructions effective to cause the one or more processors to:
  detect a triggering event configured to trigger a recognition device and a recognition action to be activated, wherein the triggering event comprises a determination that a user has entered a meeting room, and wherein the recognition action comprises recognizing the user in the meeting room; and
  based on the detected triggering event, present a notification indicating that the recognition device and the recognition action are being activated in order to recognize the user in the meeting room.

10. The system of claim 9, wherein the recognition device comprises a camera and the camera is not engaged in a video conference when the notification is presented.

11. The system of claim 9, wherein the triggering event comprises determining that the user has entered the meeting room based on at least one of detected speech or a detected a user-device proximity.

12. The system of claim 9, wherein detecting the triggering event comprises detecting a user device proximity, wherein the instructions are effective to cause the one or more processors to determine an identity paired with the user device.

13. The system of claim 9, the instructions further effective to cause the one or more processors to:
  determine an identity of the user using facial recognition, and determine a user account associated with the user;
  retrieve meetings from a calendar associated with the user account; and
  suggest an action pertaining to one of the retrieved meetings.

14. The system of claim 9, wherein the instructions are further effective to cause the one or more processors to:
  identify, using facial recognition, multiple users in the meeting room and associated with user accounts; and
  perform active speaker identification to determine a particular user from the multiple users for which to assist in an action.

15. The system of claim 9, wherein the instructions are effective to cause the one or more processors to:
  detect a wakeword and a command by a voice assistant, wherein the command is specific to a user account action;
  determine an identity of the user using facial recognition, and determine a user account for the user; and
  perform the command on behalf of the user account.

16. The system of claim 9, the instructions further effective to cause the one or more processors to:
  receive a command to disable camera activation and facial recognition in the meeting room until a condition is met;
  disable camera activation until the condition is met; and
  re-enable the recognition device based on the condition being met, wherein the condition is that no user is in the meeting room for a period of time.

17. A method comprising:
  detecting, by a device in a meeting room, a triggering event configured to trigger a recognition device and a recognition action to be activated, wherein the triggering event comprises a determination that a user has entered the meeting room, and wherein the recognition action comprises recognizing the user in the meeting room; and
  in response to detecting the triggering event comprising the determination that the user has entered the meeting room, presenting a notification indicating that the recognition device and the recognition action are being activated in order to recognize the user in the meeting room.

18. The method of claim 17, wherein the recognition device is a camera or a microphone and the camera or microphone is not engaged in a video conference when the notification is presented.

19. The method of claim 17, wherein the triggering event comprises determining that the user has entered the meeting room based on at least one of detected speech or a detected a user device proximity.

20. The method of claim 17, wherein detecting the triggering event comprises detecting a user device proximity, the method further comprising determining an identity paired with the user device.

* * * * *